May 5, 1964  A. F. ROMANOWSKI  3,131,561
FLOW MEASURING DEVICE

Filed March 2, 1961  2 Sheets-Sheet 1

INVENTOR.

BY ALBERT F. ROMANOWSKI

*Albert L. Jeffers*

ATTORNEY

May 5, 1964  A. F. ROMANOWSKI  3,131,561

FLOW MEASURING DEVICE

Filed March 2, 1961  2 Sheets-Sheet 2

INVENTOR.
BY ALBERT F. ROMANOWSKI
*Albert L. Jeffers*
ATTORNEY

United States Patent Office 3,131,561
Patented May 5, 1964

3,131,561
FLOW MEASURING DEVICE
Albert F. Romanowski, Fort Wayne, Ind., assignor to Bowser, Inc., Fort Wayne, Ind., a corporation of Indiana
Filed Mar. 2, 1961, Ser. No. 92,791
6 Claims. (Cl. 73—229)

This invention relates to a positive displacement fluid flow meter and more particularly to a pulse type transducer which is especially adapted to measuring fluid displacement in small orders of flow by producing electrical impulses in direct proportion to the quantity of flow.

Prior art devices which have been previously used to measure fluid flow combined with transducers such expedients as photo-cells with light beam interrupters or deflectors reluctance pick-up coils with magnetic metal interrupters and inductance pick-up coils with magnetized interrupters; such combinations are inherently limited to measuring flow which is regular in flow rate. The prior art devices are unsuitable for measuring reduced flow rate and especially so where the reduced rate either varies or is intermittent because additional pulses are produced from internal oscillations of the device which in turn produce a false recording by the instrument. Because reluctance and inductance of the pick-up coil type devices produce a relatively low voltage value, the range of operation is limited and efforts to correct this by providing higher gear ratios between the transducer and meter are largely ineffective because of the increase in pulse output which is undesirable in many applications and also amplifies oscillating conditions in the system which produce error.

One of the objects of the present invention is to provide a transducer which is accurate in operation at low orders of flow and which does not lose its accuracy of measurement regardless of change in flow or intermittency of flow. One of the reasons why the present invention achieves the foregoing result is that the transducer is not subject to oscillations so that there is directly related to the degree of flow, the rotation of a rotatable member which produces a series of impulses which are in direct correspondence with the rate and quantity of flow. Elimination of oscillations removes errors in the correlation of flow and quantity of electrical impluses from the device.

A further object of the invention is to produce a pulse transducer which is readily adaptable to measuring a substantial range of flow and is readily adjustable in accordance with predetermined predominant flow conditions which are to be measured. That is, where the flow to be measured is primarily within a given range, the device can be readily adjusted to provide maximum accuracy within that range. Likewise, the device is adjustable to provide a considerable range of electrical impulse output in accordance with the recording device selected. Thus, depending upon the sensitivity and characteristics of the recording device, the transducer can be readily adjusted to provide the signal best adapted for that recording device.

A further object of the invention is to provide a pulse transducer which can measure either rate of flow or quantity of flow or both and particularly in the range of low orders or flow approaching and reaching zero flow.

The significance of my having achieved the foregoing features of the invention may be appreciated when considered in light of prior art devices which all share the defect of producing unwanted oscillations, especially at low flow condition, these oscillations being transmitted to the recording device as impulses which are not related to flow and hence produce inaccuracy. Moreover, it should be appreciated that the electrical impulses which are produced in the instruments of the type described are necessarily of low magnitude but one of the features of the present invention is that adjustment of the device can be made to adapt the transducer to whatever output signal is desired within certain limits by means of novel flux path return means and also by disposing the components forming the transducer at preselected relative positions. Consequently, the device is highly adaptable to measure a variety of flow conditions, and can be further adapted to render a variation of output pulsations according to the type of information required or computer selected for receiving said impulses.

Other objects and features of the invention will become apparent from a consideration of the following description which proceeds with reference to the accompanying drawings, in which.

Figure 1:
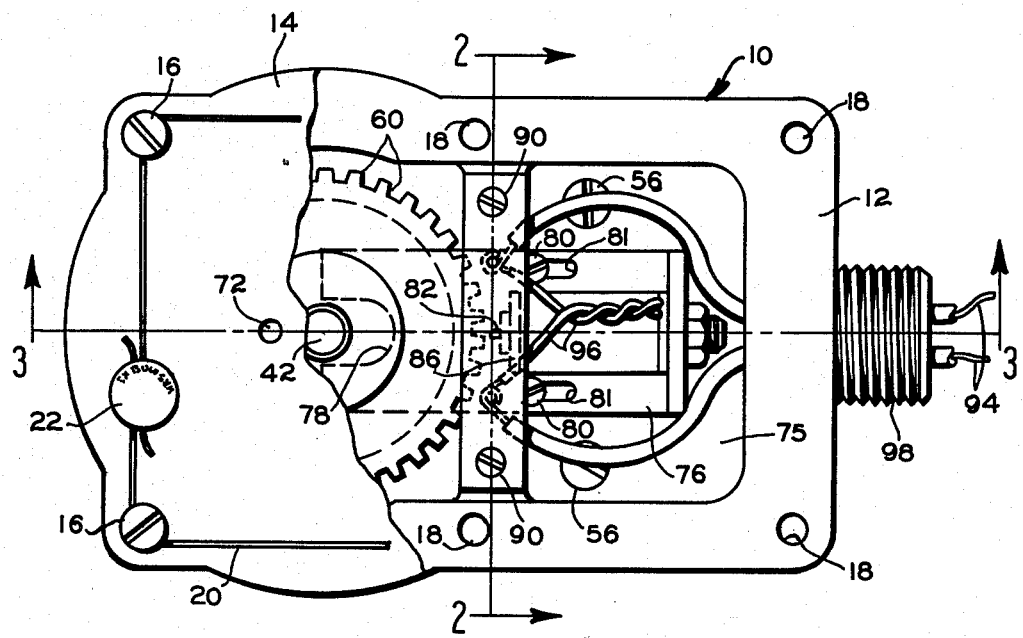
FIGURE 1 is a view of the transducer with a portion of the cover broken away to illustrate the interior components thereof.

The transducer, designated generally by reference numeral 10, is incorporated within a complete system which includes both a suitable turbine connection with the flow source being measured and a recording device which receives information from the transducer and translates it to an intelligible form. Both of these latter two components are not shown. It will be appreciated that any flow can be measured by means of the present invention but its novelty is most apparent and can be used to best advantage when measuring a variable flow and particularly flows which require accurate measurement as they approach zero flow. Also, the particular instrument selected for recording information from the transducer can be selected according to the form of the information wanted. For example, rate of flow may be desired and a continuous record thereof provided or quantity of flow over a time duration may be selected. Either kind of instrument may be used in combination with the present invention and I do not limit the invention either to the recording instrument or the material whose flow is being measured.

The transducer is housed within a cast aluminum case 12 and is provided with a cover 14 which is secured to the case 12 through a number of screws 16 which are received within threaded openings 18 of the case and are thereafter secured by a seal wire 20 joined at its ends by a seal 22 which prevents removal of the cover except by authorized personnel.

An output shaft 24 (FIGURE 3) is connected with a coupling 26 and is driven rotatably by the flow being measured. There is a direct correlation therefore between quantity of flow and rotation of the output shaft 24 which is supported at opposite ends for its rotatable movement on carbon bearings 28. The output shaft 24 extends through a second cover plate 30 and mounting plate 32 so that the transducer is accessible by removing either of the cover plates 14 or 30 for servicing or installing the transducer. The cover plate 30 is held in place by means of fillister head screws 34 which also serve to mount the device 10 in its operative position on the mounting plate 32. The shaft 24 has a drive gear 36 with a toothed outer periphery 38 meshing with teeth of a pinion gear 40 which is secured to shaft 42 by a cross pin 44, the shaft 42 being mounted on two spaced ball bearings 46 and 48. The shaft 42 extends upwardly within cavity 50 of the case 12 through opening 52, the two cases 12 and gear case 54 being secured together by screws 56.

Figure 3:
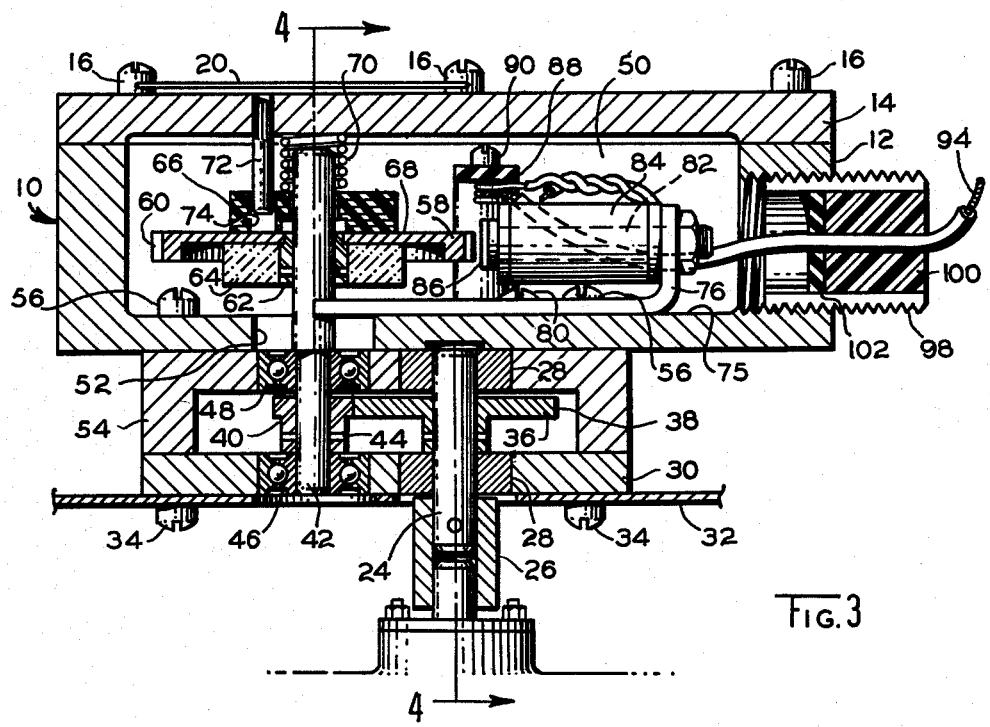
FIGURE 3 is a sectional view taken on line 3—3 of FIGURE 1.
Figure 4:
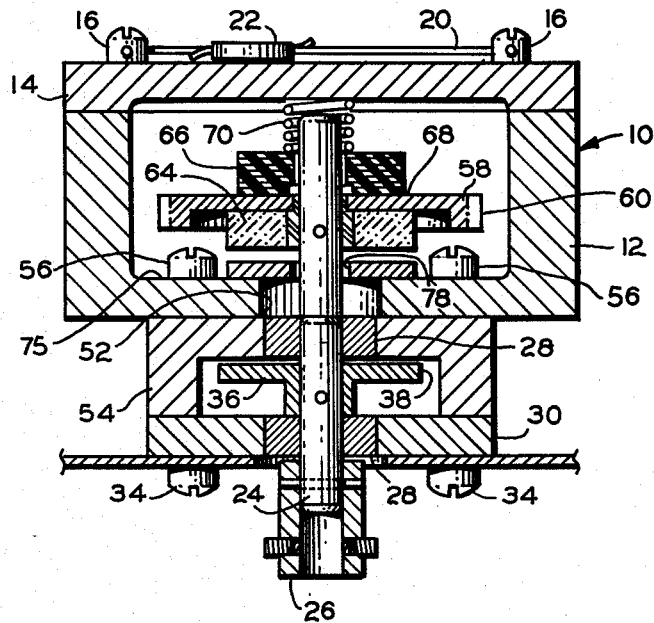
FIGURE 4 is a sectional view taken on line 4—4 of FIGURE 3.

On the upper end of the shaft 42 is mounted a disk shaped rotor 58 having teeth 60 at its outer periphery which are spaced at regular intervals around the entire circumference of the rotor 58 (FIGURES 1 and 3). Each tooth is adjoined by an indentation as best seen in FIGURE 1. The rotor is carried on a hub 62 and has at its bottom surface a permanent magnet 64 which may be of ceramic composition, one suitable magnet being that produced by Indiana Steel Products and identified by them as Cat. No. F-1408. At the side of the rotor opposite the magnet is a stack of laminated Bakelite washers 66 which are biased into frictional engagement with surface 68 of the rotor by a compressed coil spring 70 which may be loaded by suitable adjustment to provide whatever frictional resistance is desired between the Bakelite washers 66 and surface 68. The function of the disks is to impede rotation of the rotor 58, the disks being prevented from rotation with the rotor by means of a pin 72 received within opening 74. The pin is held in place on the cover 14.

Slidably mounted on the base 75 of case 12 is a coil support 76 having a recess 78 (FIGURE 1) which is proportioned to slide past the shaft 42 thereby permitting adjustment of the support 76 radially of the rotor 58 and which is thereafter fixed in place by screws 80 which are passed through elongated openings 81 (FIGURE 1). The support 76 carries an armature 82 and a coil 84.

A collar 86 is spaced closely adjacent the outer periphery of the rotor 58 and its position can be determined relatively to the rotor by sliding the support 76 toward or away from the rotor to determine the flux intensity which is received by the armature 82.

Figure 2:
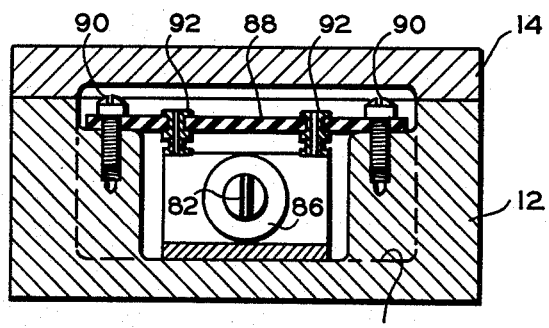
FIGURE 2 is a sectional view taken on line 2—2 of FIGURE 1.

Referring to FIGURE 2, a terminal board 88 of Bakelite composition is mounted through screws 90 to the case and provides solder terminals 92 to which are fastened the lead wires 94, the coil also being connected to the terminals by conductors 96.

The lead wires are passed through a threaded conduit 98 having sealing compound 100 comprising litharge and glycerine and a retainer 102 of vellumoid or the like.

In operation, the shaft 24 is caused to rotate by the flow being measured thereby driving shaft 42 through drive gear 36 and pinion 40. The rotating shaft 42 also drives rotor 58 which, by reason of the magnet 64, subjects the armature 82 to a pulsating flux, the flux being of greatest intensity at the outer periphery of the rotor at the tips of the teeth 60 and of lowest intensity at the indentations between successive teeth. Thus as the rotor 58 turns past the armature 82, the armature is subjected to an irregular flux in the form of pulsations. The flux intensity for the armature is regulated by shifting the support 76 toward or away from the periphery of the rotor 58 by loosening the screws 80, sliding the support 76 in one direction or the other and thereafter tightening the screws. The coil support 76 also serves as a flux return path for the magnet with the effect of increasing the magnetic flux between the armature and the rotor teeth.

Any number of pulsations can be provided per revolution of the rotor by simply controlling the number of teeth in the rotor. It is intended that various size rotors can be mounted on the shaft 42 having the desired number and spacing of teeth and thereafter adjusting the position of the support 76 in accordance with the selected rotor 58.

In order to accurately measure the flow, it is absolutely essential that the impulses received by the armature from the teeth by related only to the degree of rotation of the rotor as produced by the flow. Should the rotor oscillate or wobble, this will be sensed as an additional flux impulse by the armature thereby rendering an erroneous indication of flow. During starting, stopping or change in speed of the rotor and especially during slow rotational speed of the rotor, it is imperative that oscillation of the rotor be completely damped. This is accomplished by means of the Bakelite washers 66 which sufficiently impede rotation of the rotor 58 that the rotor will not oscillate or wobble during stopping, starting or change in rotational speed of the rotor regardless of angular speed of the rotor.

The pulsating flux to which the armature is subjected induces within the coil 84 a pulsating voltage which is then transmitted through conductors 96 to the lead wires 94 connected with a recording instrument or computer which provides intelligible information regarding flow rate, flow amount or both.

Another feature which is contained in the invention is that the pulsating flux is necessarily of small magnitude and therefore the sensitivity of the device must be sufficient to take maximum use of the pulsation. This is accomplished by reason of the fact that the rotor is uniformly retarded by the washers 66 but as each tooth 60 approaches alignment with the armature 82 it tends to accelerate thereby increasing the flux and enlarging the resultant impulse sensed by the armature, and its consequent electrical impulse with the coil and conductors 94. as previously mentioned, the flux is also increased by using the support 76 as a flux return path and a flux intensity can be realized at its maximum intensity by adjusting the armature toward or away from the rotor so that the pulsations are accurately recorded. The relatively minute flux pulsation is thus magnified and the coil structure adapted to its reception to provide strong electrical output impulse.

As a result of the foregoing operation, mechanical movement is translated to the equivalent of magnetic flux pulsations, there being a precise and accurate correlation between mechanical movement which directly measures flow and the magnetic pulsations produced by said mechanical movement. It forms an important part of the present invention that I have achieved this precision of correlation between magnetic impulse generation without there being produced oscillations which interfere with an exact correlation. The magnetic flux pulsations are in turn accurately transduced by adjustable means to an electrical pulsating voltage which is then communicated to a suitable recording or calculating instrument.

The invention is by no means limited to the measurement of the flow of liquid but is also useful for measuring any occurrence which is effective to produce a change in shaft position, speed or total number of revolutions.

The present invention is, however, especially suited for and is intended for usage for measurement of output of gasoline pumps where it is necessary to convert mechanical flow to a predetermined electrical pulsation per gallon of flow through the meter, said pulsations being recorded on a computer or electrical counter.

Although the present invention has been illustrated in connection with a single selected embodiment, it will be understood that this is only illustrative of the invention and is in no sense restrictive thereof. It is intended that such variations and revisions of the invention as are reasonably to be expected on the part of those skilled in the art to suit individual design requirements, will be included within the scope of the following claims as equivalents of the invention.

What is claimed is:

1. In a device for measuring flow, the combination comprising an output shaft which is rotated responsively to said flow, means rotatably driven by said output shaft and having support bearings for mounting said means, a disk including a toothed outer periphery and carried by said rotatable means, a magnet disposed at one side of said disk, and friction means engaging the side of said disk opposite from said magnet to retard rotation of said disk, means for biasing said friction means with a preselected normal force against the opposed surface of said disk, a flux responsive means disposed radially outwardly from said disk and movable adjustably toward or away from the outer periphery of said disk to sense variation of flux between successive teeth on the outer periphery of said rotor and which are spaced at regular intervals about the periphery of said disk, a coil in combination with said flux responsive means for generating a pulsating voltage therein having amplitude which varies in response to the variation in flux, and conductor means for receiving the voltage impulses of said coil and providing a measurement of the rotation of said disk which is effected by said flow.

2. A measuring device which is responsive to low orders of flow and characterized by sensitivity to a wide variation in flow, comprising drive means which is motivated by said flow, a rotor having an outer periphery with regularly spaced projections arranged in a circular path, means for supporting said rotor for its rotational movement and operatively connected with said drive means to effect rotational speed of said rotor in direct proportion with said flow, flux-producing means supported adjacent said rotor for effecting magnetization of said rotor which thereby provides at its outer periphery regularly spaced intervals of maximum and minimum magnetic flux intensity, a friction member engaging said rotor to impede its rotational movement and including means for biasing said member against its opposed rotor surface, an armature located adjacent said disk and movable adjustably toward and away from the outer periphery of said rotor to receive a pulsating flux generated from roation of said rotor relatively thereto, a coil in combination with said armature having induced therein a pulsating voltage in response to said pulsating flux, and conductor means responsive to said voltage for providing a sensible measurement of the rotation of said rotor effected by said flow and providing thereby a measurement of said flow.

3. In a device for measuring flow, the combination comprising means rotated responsively to said flow, a disk including a toothed outer periphery and rotatably driven by said rotatable means, a magnet disposed at one side of said disk, and friction means engaging the side of said disk opposite from said magnet to retard rotation of said disk, a flux responsive means disposed radially outwardly from said disk and movable adjustably toward or away from the outer periphery of said disk to sense variation of flux between successive teeth on the outer periphery of said rotor and which are spaced at regular intervals about the periphery of said disk, a coil in combination with said flux responsive means for generating a pulsating voltage therein having amplitude which varies in response to the variation in flux, means providing a flux return path for said magnet to increase the flux intensity between said teeth and flux responsive means and conductor means for receiving the voltage impulses of said coil and providing a measurement of the rotation of said disk which is effected by said flow.

4. A measuring device which is responsive to low orders of flow and characterized by sensitivity to a wide variation in flow, comprising drive means which is motivated by said flow, a rotor having an outer periphery with regularly spaced projections arranged in a circular path, means for supporting said rotor for its rotational movement and operatively connected with said drive means to effect rotational speed of said rotor in direct proportion with said flow, flux-producing means supported adjacent said rotor for effecting magnetization of said rotor which thereby provides at its outer periphery regularly spaced intervals of maximum and minimum magnetic flux intensity, friction means engaging said rotor to impede its rotational movement, an armature located adjacent said disk and movable adjustably toward and away from the outer periphery of said rotor to receive a pulsating flux generated from rotation of said rotor relatively thereto, a coil in combination with said armature having induced therein a pulsating voltage in response to said pulsating flux, a flux guide member for intensifying the flux between said teeth and armature, and conductor means responsive to said voltage for providing a sensible measurement of the rotation of said rotor effected by said flow and providing thereby a measurement of said flow.

5. A measuring device comprising a movable member having regularly spaced projections thereon, a magnet for producing lines of flux in said member which are provided in greatest intensity at said projections, an armature disposed adjacent said movable member to receive a pulsating flux intensity effected by relative movement between said member and armature, drive means for effecting movement of said member in direct correspondence with a periodic flow, friction means for damping movement of said member whereby magnetic pulsations are transmitted to said armature in precise correspondence with said flow, and means for converting said magnetic pulsation to electrical pulsation which is recordable in measurement of said flow.

6. A measuring device comprising a movable member having regularly spaced projections thereon, a magnet for producing lines of flux in said member which are provided in greatest intensity at said projections, an armature disposed adjacent said movable member to receive a pulsating flux intensity effected by relative movement between said member and armature, drive means for effecting movement of said member in direct correspondence with a periodic flow, friction means for damping movement of said member whereby magnetic pulsations are transmitted to said armature in precise correspondence with said flow, means for regulating the frequency and intensity of said magnetic pulsations and means for converting said magnetic pulsation to electrical pulsation which is recordable in measurement of said flow.

References Cited in the file of this patent

UNITED STATES PATENTS

| | | |
|---|---|---|
| 1,950,419 | Sinderson | Mar. 3, 1934 |
| 2,579,318 | Hershberger | Dec. 18, 1951 |
| 2,702,897 | Dewey | Feb. 22, 1955 |
| 2,713,625 | Milcher | June 17, 1956 |
| 2,913,662 | Hogan | Nov. 17, 1959 |